US008612799B2

(12) United States Patent
Zhang

(10) Patent No.: US 8,612,799 B2
(45) Date of Patent: Dec. 17, 2013

(54) METHOD AND APPARATUS OF BACKING UP SUBVERSION REPOSITORY

(75) Inventor: Jing Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 13/131,580

(22) PCT Filed: Nov. 30, 2010

(86) PCT No.: PCT/US2010/058407
§ 371 (c)(1),
(2), (4) Date: May 26, 2011

(87) PCT Pub. No.: WO2011/109049
PCT Pub. Date: Sep. 9, 2011

(65) Prior Publication Data
US 2012/0324279 A1  Dec. 20, 2012

(30) Foreign Application Priority Data

Mar. 4, 2010 (CN) .......................... 2010 1 0119877

(51) Int. Cl.
*G06F 11/00* (2006.01)
(52) U.S. Cl.
USPC ............................. 714/6.3; 707/638; 707/646
(58) Field of Classification Search
USPC .................................. 714/6.3; 707/638, 636
See application file for complete search history.

(56) References Cited

U.S. PATENT DOCUMENTS

| | | | |
|---|---|---|---|
| 6,289,357 B1 * | 9/2001 | Parker ............................ | 707/610 |
| 6,681,390 B2 | 1/2004 | Fiske | |
| 7,085,957 B2 | 8/2006 | Sundareson et al. | |
| 7,117,329 B2 | 10/2006 | Watanabe et al. | |
| 7,647,363 B2 | 1/2010 | Walsh et al. | |
| 7,657,582 B1 | 2/2010 | Cram et al. | |
| 7,739,655 B1 | 6/2010 | Monteiro et al. | |
| 8,176,272 B2 * | 5/2012 | Augenstein et al. .......... | 711/162 |
| 8,346,719 B2 * | 1/2013 | Sudhakar ...................... | 707/610 |
| 2003/0158831 A1 | 8/2003 | Zaremba | |
| 2004/0039889 A1 * | 2/2004 | Elder et al. .................... | 711/162 |

(Continued)

FOREIGN PATENT DOCUMENTS

| | | |
|---|---|---|
| CN | 1873622 A | 12/2006 |
| CN | 101038591 A | 9/2007 |

OTHER PUBLICATIONS

PCT Intl Search Report and Written Opinion for Application No. PCT/US10/58407, mailed Jan. 26, 2011, 9 pgs.

(Continued)

*Primary Examiner* — Yolanda L Wilson
(74) *Attorney, Agent, or Firm* — Lee & Hayes, PLLC

(57) ABSTRACT

The present disclosure provides a method and apparatus for backing up a subversion repository. In one embodiment, a method of backing up a subversion repository wherein a version attribute of a backup repository is preset and identifies a latest version of the backup repository, the method comprises: synchronizing the backup repository based on the version attribute of the backup repository; in an event of successful synchronization, updating the version attribute of the backup repository with an identification of a synchronized version; and in an event of unsuccessful synchronization, determining that a current version to be a non-synchronizable version, backing up an original repository by duplicating a copy of the original repository, and updating the version attribute of the backup repository with an identifier of the non-synchronizable version.

15 Claims, 3 Drawing Sheets

(56) References Cited

U.S. PATENT DOCUMENTS

| | | | |
|---|---|---|---|
| 2005/0097260 A1 | 5/2005 | McGovern et al. | |
| 2005/0177603 A1* | 8/2005 | Shavit | 707/204 |
| 2009/0228509 A1* | 9/2009 | McCarthy et al. | 707/102 |
| 2010/0145914 A1* | 6/2010 | Kanno et al. | 707/638 |
| 2010/0242032 A1 | 9/2010 | Ladki et al. | |
| 2010/0274765 A1* | 10/2010 | Murphy et al. | 707/652 |

OTHER PUBLICATIONS

Chinese Office Action mailed Oct. 10, 2012 for Chinese patent application No. 201010119877.4, a counterpart foreign application of U.S. Appl. No. 13/131,580, 7 pages.

Extended European Search Report mailed Aug. 26, 2013 for European patent application No. 10847156.6, 9 pages.

* cited by examiner

METHOD AND APPARATUS OF BACKING UP SUBVERSION REPOSITORY

CROSS-REFERENCE TO RELATED PATENT APPLICATIONS

This application is a national stage application of an international patent application PCT/US10/58407, filed Nov. 30, 2010, which claims priority from Chinese Patent Application No. 201010119877.4, filed on Mar. 4, 2010, entitled "Method and Apparatus of Backing-Up Subversion Repository", which applications are hereby incorporated in their entirety by reference.

TECHNICAL FIELD

The present disclosure relates to the field of computer, and specifically to the method and apparatus for backing-up a subversion repository.

BACKGROUND

Subversion, referred to as SVN, is a type of recently-developed code version management software. SVN has more advantages than the traditional version control software. At present, there are an increasing number of users utilizing SVN to manage and control code.

The current code management software requires a backup repository. The simplest and frequently-used backup method is the direct duplicate command wherein the repository retains a copy of given content to backup the content. However, the volume of data in a repository is usually very large and each full backup takes a long time to complete.

Another method currently used in existing technologies is the sync command wherein the repository is synchronized. The backup repository merely updates the last content that needs backup in every synchronization operation. Thus, backup speed time increases. However, a problem in this approach is that when an error occurs during the synchronization process, the subsequent version would not be synchronized and the current data that is properly backed up would no longer be used. Moreover, even if a new backup is deployed there is still no guarantee that a synchronization operation error would not emerge. In other words, the repository synchronization operation may not be able to continue.

SUMMARY OF THE DISCLOSURE

To solve the aforementioned technological problem, the disclosure provides exemplary implementations on the method and apparatus for backing up a subversion repository. This is to process the synchronization errors of the repository and to ensure that the synchronization operation is capable to continue.

In one aspect, a method of backing up a subversion repository wherein a version attribute of a backup repository is preset and identifies a latest version of the backup repository, may comprise: synchronizing the backup repository based on the version attribute of the backup repository; in an event of successful synchronization, updating the version attribute of the backup repository with an identification of a synchronized version; and in an event of unsuccessful synchronization, determining that a current version to be a non-synchronizable version, backing up an original repository by duplicating a copy of the original repository, and updating the version attribute of the backup repository with an identifier of the non-synchronizable version.

The determining that a current version to be a non-synchronizable version may comprise: acquiring an error message of synchronization failure; and determining the current version to be a non-synchronizable version based on the error message; or determining the current version to be a non-synchronizable version in the event of continued synchronization failure after error processing corresponding to the error message.

The error processing corresponding to the error message may comprise deleting a synchronization lock attribute of the backup repository in the event that the error message indicates the backup repository as locked.

The error processing corresponding to the error message may comprise deleting a lock attribute of a file in the backup repository in the event that the error message indicates the file in the backup repository as locked.

The error processing corresponding to the error message may comprise deleting a latest version of the backup repository and modifying a version attribute of the backup repository to that of a penultimate version in the event that the error message indicates an error in the latest version of the backup repository.

In another aspect, an apparatus for backing up a subversion repository may comprise: a synchronization unit that implements a synchronization operation of the subversion repository based on a version attribute; a synchronization success processing unit that, in the event that the synchronization operation by the synchronization unit is successful, sets a version attribute of a backup repository to a value of a latest version; and a synchronization failure processing unit that, in the event that the synchronization operation by the synchronization unit is unsuccessful, backs up the subversion repository by duplicating a copy of the subversion repository and sets the version attribute of the backup repository to a value of a last non-synchronizable version.

The apparatus may further comprise a non-synchronizable version determining unit that includes: an error message acquisition sub-unit that acquires an error message when the synchronization operation fails; a first determining sub-unit that determines a current version as a non-synchronizable version based on the error message; an error processing sub-unit that processes one or more errors based on the error message; and a second determining sub-unit that determines the current version as a non-synchronizable version when synchronization still fails after the one or more errors have been processed.

In the event that the error message indicates the backup repository as locked, the error processing sub-unit may delete a synchronization lock attribute of the backup repository.

In the event that the error message indicates a file in the backup repository as locked, the error processing sub-unit may delete a lock attribute of the file in the backup repository.

In the event that the error message indicates an error in a latest version of the backup repository, the error processing sub-unit may delete the latest version of the backup repository and modify a version attribute of the backup repository to that of a penultimate version.

In the currently existing technology, an empty backup repository must be established and initialized prior to synchronizing. In the case of an error occurring, a subsequent version would not be synchronized and the current data that was correctly backed up would no longer be accessed. In contrast, embodiments of the present disclosure need not initialize the backup repository by directly setting the version attribute. When the synchronization fails, the technique copies the original backup repository and modifies the version attribute, and this can enable the synchronization to continue.

In addition, the present disclosure focuses on some specific causes of synchronization failure. Corresponding automatic processing methods are provided. As these methods can continue synchronization without need of duplicating the entire original repository, then the backup process is optimized.

DESCRIPTION OF DRAWINGS

In order to clearly illustrate the implementation of the exemplary embodiments or the technological plan of currently existing technologies, below are diagrams with brief descriptions. Obviously, the diagrams below are merely some exemplary implementation and an ordinary person in the arts could use these as a basis for other diagrams.

DETAILED DESCRIPTION

In the current repository synchronization method, there needs to be established an empty backup repository and it needs to be initialized using SVN sync init command prior to the first synchronization of the repository. In the event of an error occurring, a subsequent version would not be synchronized and the current data which has been properly backed up would no longer be used. Even though a new backup is deployed, there is still no guarantee that a synchronization error would not emerge.

To address the aforementioned technological problem, the proposed technological plan of this disclosure can be summarized as follows: the pre-set version attribute of the backup repository is used to record the latest version of the backup repository. Under normal circumstances, the "latest version" should be the last successfully synchronized version. When the synchronization fails, one can modify the attribute value so that the synchronization can still be sustained.

In one embodiment, a method for backing-up the subversion repository comprises: synchronizing the repository according to the version attribute; if synchronization is successful, the backup repository version attribute value is considered the most updated synchronized version; and if synchronization fails, the entire original repository is backed up and the identification (ID) of the last non-synchronizable version is considered the most updated version attribute value.

In applying this method, there is no need to initialize the backup repository. The method can directly set up the version attribute of the backup repository. When there is no way to accurately synchronize, the method can back up the copy of the original repository and modify the backup repository version attribute so that synchronization can be continued on the current copy.

In order for a person of ordinary skill in the art to better comprehend the technological scheme, diagrams are herein attached of the exemplary implementation of the present disclosure. The technological plan of the present disclosure is presented with clear and complete descriptions. It is understood that other implementations obtained by a person skilled in the art are within the scope of the present disclosure.

Figure 1:
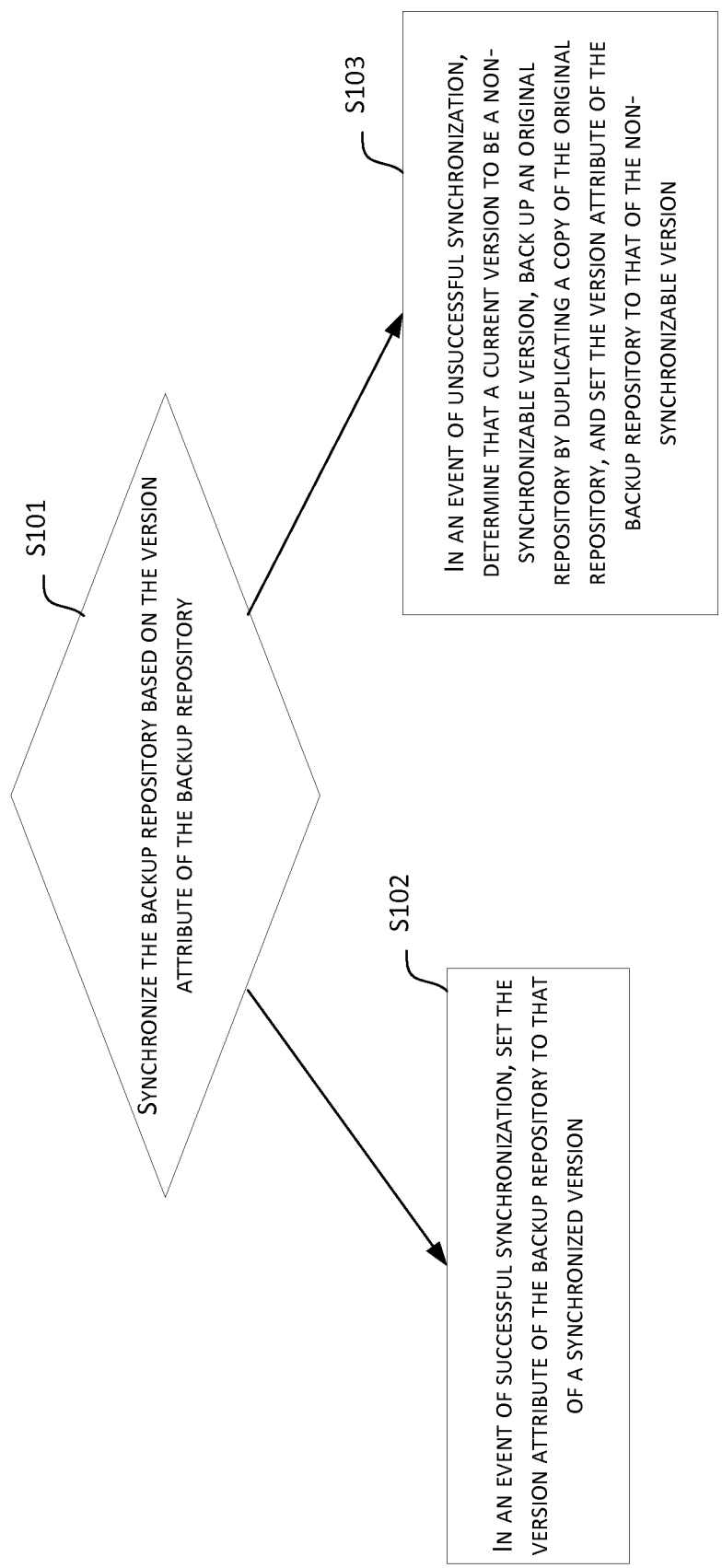
FIG. 1 shows a flow chart of the method for backing up a subversion repository according to an embodiment of the present disclosure.

FIG. 1 illustrates a flow chart of the method for backing up a subversion repository according to an embodiment of the present disclosure. For example, repo1 is the original repository and repo2 is the backup repository. The method comprises procedures as described below.

At S101, the method synchronizes the backup repository based on the version attribute of the backup repository.

Prior to the synchronization of the repository, the method sets up the backup repository. The necessary set-up attribute comprises the version attribute of the backup repository as follows: svn: sync-last-merged-rev.

This attribute records the latest version of the backup repository, namely the version number repo2/db/current. If the current repository is empty, the version number can be assumed to be 0. For any subsequent synchronization, the method can continue synchronizing the subsequent version by just reading the attribute.

In addition, the required set-up of the backup repository attribute further comprises the ID of the original repository as: svn: sync-from-uuid.

During synchronization, the attribute recorded is the repository ID labeled as uuid. In the exemplary implementation of the present disclosure, the version attribute value set-up is the uuid of repo1.

The address of the original repository is: svn: sync-from-url.

The attribute record should contain the memory path of the original repository. In various embodiments of the present disclosure, the set-up of the attribute value can be considered as the memory path of repo1.

The aforementioned attributes are equivalent to the overall attributes of repo2. After completing the setup of the version attribute, the original repository and the backup repository will establish a synchronization link. The method can execute the command svnsync sync http://localhost/repo2 to synchronize the repositories. Based on the repo2 version attribute sync-last-merged-rev, the original repository version will be replaced and put into the backup version repo2.

To configure further, when the newly revised version of repo1 is reported, an automatic synchronization can be activated. Thus, the method establishes real-time synchronization of repo1 and repo2. For instance, when the newly revised version of repo1 is reported by the system, a synchronization operation can be triggered automatically through the post-commit file of repo1 script definition.

At S102, in an event of successful synchronization, the method sets the version attribute of the backup repository to that of a synchronized version.

Under normal circumstances, for every synchronization operation, the attribute of the version repo2 is automatically updated to the identification of the successfully backed-up version. For any subsequent synchronization, update will be directly based on the content of the version.

At S103, in an event of unsuccessful synchronization, the method determines that a current version to be a non-synchronizable version, backs up an original repository by duplicating a copy of the original repository, and sets the version attribute of the backup repository to that of the non-synchronizable version.

One can directly determine the current version as the non-synchronizable version if the synchronization is unsuccessful. The "non-synchronizable version" here refers to a version that still operates properly without problems in the code, but for whatever reason it cannot be correctly synchronized in the backup repository. At this point, the entire original repository (including those versions that cannot be backed up) can be backed up to the backup repository.

In currently existing technologies, synchronization can only be started after an empty backup repository is initialized. If the previous version was backed up by duplicating a copy, synchronization would not be possible. On the other hand, in embodiments of the present disclosure, the version attribute of the backed up repository is to be modified into the version number of a non-synchronizable operation, when the backup is done by duplicating a copy. In other words, the system distinguishes the duplicate backup version from the synchronization backup version by modifying the version attribute. Thus, the non-synchronizable version would be skipped to guarantee uninterrupted synchronization.

In a practical application, certain failure of synchronization due to some specific reasons can be processed rapidly by means of a certain method. In particular, the present disclosure offers automatic processing methods in the event of failed synchronizations.

When synchronization fails, an error message is obtained. Commonly seen error messages include: backup repository locked, file in the backup repository locked, error on the latest version of the backup repository, etc. These errors will be distinguished below.

a. Backup Repository Locked

Such an error message is similar to "Failed to get lock on destination repos, currently held by 'alicode: 1b27a4fd-fb0e-42a0-a13f-9091cc87b9ac'," where "alicode" is the machine name.

During synchronization, Internet disconnection or other factors can lead to abortion of the sync procedure, and the next synchronization would fail. To address this issue, the lock protection of the backup repository needs to be cleared. The following command deletes the synchronization lock attribute of the backup repository: svn propdel svn:sync-lock--revprop-r 0 http://localhost/repo2.

b. File in the Backup Repository Locked

The corresponding error message may be as follows: svnsync: Server sent unexpected return value (423 Locked)

A subversion client can use the lock function to lock a directory or file wherein only the user can modify the file or directory. When the backup repository comes across this version during synchronization, synchronization normally fails. To gain access and to continue even with a locked file, the method can execute the following command: svnadmin rmlocks repo2/xxxx. Here, "xxxx" is the locked file path and file name.

c. Error on the Latest Version of the Backup Repository

The corresponding error message may be as follows: svnsync: Missing node-id in node-rev.

During the synchronization process, this error may be due to a faulty Internet network or low response speed of the repository that causes the backup repository to submit incomplete information about the latest version. Because of incomplete synchronization, the backup repository cannot be used and synchronization would not be continued. In one embodiment, the method can delete the latest version of the backup repository. Specifically, the method may delete the latest version under the paths repo2/db/revs and repo2/db/reprops. Simultaneously, the version number as recorded in repo2/db/current is decremented by 1. Furthermore, the method may modify the version attribute value to the identification of the penultimate version of the repository, so that prior to the subsequent synchronization, the problematic part of the original version would not be backed up.

Three common reasons for synchronization failure and the corresponding error corrections are provided above. If the problem is handled as described above, synchronization process can be continued and duplication of the entire repository can be averted. This advantageously increases the backup efficiency of the repository. If the synchronization still fails after the corresponding error correction has been processed, it can be determined that the current version is a non-synchronizable version and that action S103 described above would then be implemented.

The reasons for the failure of synchronization may vary. On the one hand, the fast processing of the errors is not limited to the three types described above. A person of ordinary skill in the art can add additional fast error processing measures based on the actual circumstances. On the other hand, when the reason of the error cannot be clearly determined or when the error cannot be processed rapidly, one can determine that the current version is a non-synchronizable version based on the error message and that action S103 described above would then be implemented.

Figure 2:
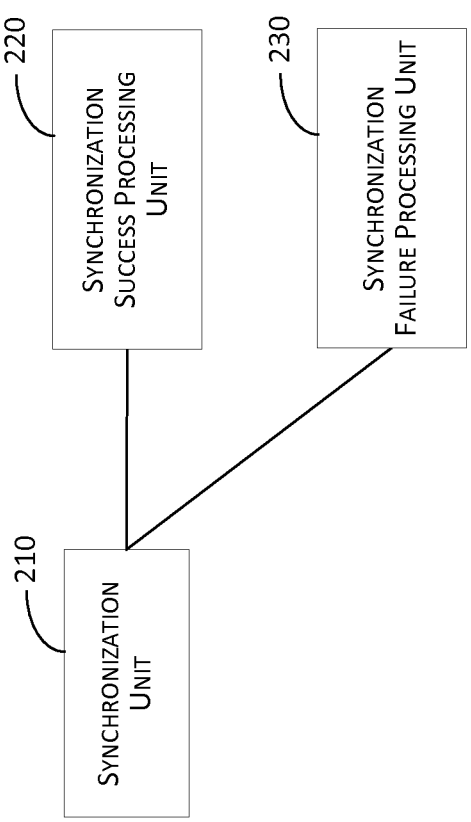
FIG. 2 shows a structural diagram of an apparatus for backing up the subversion repository according to an embodiment of the present disclosure.

The present disclosure provides an apparatus for backing up a subversion repository. As shown in FIG. 2, the apparatus comprises: a synchronization unit 210, a synchronization success processing unit 220, and a synchronization failure processing unit 230.

The synchronization unit 210 implements a synchronization operation of the subversion repository based on the version attribute.

The synchronization success processing unit 220 is used when the synchronization operation by the synchronization unit 210 is successful. The synchronization success processing unit 220 sets the version attribute of the backup repository to a value of the latest version. The synchronization failure processing unit 230 is used when the synchronization operation by the synchronization unit 210 is unsuccessful. The synchronization failure processing unit 230 backs up the subversion repository by duplicating a copy of the subversion repository, and sets the version attribute of the backup repository to a value of a last non-synchronizable version.

Figure 3:
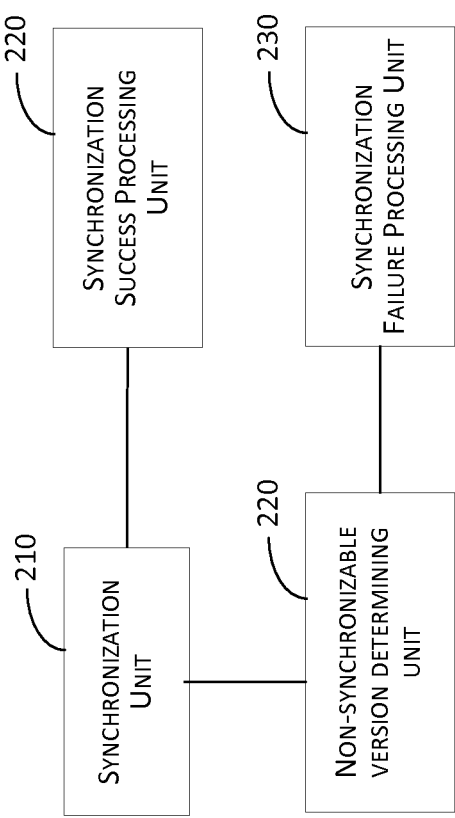
FIG. 3 shows a structural diagram of an apparatus for backing up the subversion repository according to another embodiment of the present disclosure.

With the above-described apparatus for backing up a subversion repository, there is no need to initialize the backup repository. By directly setting the attribute value of the backup repository, backing-up can be accomplished by duplicating a copy when synchronization is not feasible. Afterwards, the version attribute of the backup repository can be modified to allow synchronization based on the copied backup. FIG. 3 shows an apparatus for backing up a subversion repository similar to that shown in FIG. 2 but further comprises a non-synchronizable version determining unit 240. The non-synchronizable version determining unit 240 comprises a number of sub-units as described below.

The error message acquisition sub-unit acquires the error message when the synchronization operation fails.

The first determining sub-unit determines the current version as a non-synchronizable version based on the error message.

The error processing sub-unit processes one or more errors based on the error message.

The second determining sub-unit determines the current version as a non-synchronizable version when synchronization still fails after the one or more errors have been processed.

When the error message indicates that the backup repository is locked, the error processing sub-unit deletes the synchronization lock attribute of the backup repository.

When the error message indicates that a file in the backup repository is locked, the error processing sub-unit cancels the locked attribute of such file.

When the error message indicates error in the latest version of the backup repository, the error processing sub-unit deletes the latest version of the backup repository and modifies a version attribute of the backup repository to that of a penultimate version The non-synchronizable determining unit 240 can provide the corresponding automatic processing for certain specific causes of synchronization failure. Backup by duplicating a copy can be avoided if synchronization can proceed after automatic processing as described above, and this further increases the backup efficiency.

For the convenience of description, the above-mentioned apparatus is divided into functional modules. Upon the implementation of the embodiments, the functions of one or more units can be placed into one or more instances of software and/or hardware.

With the description above, a person of ordinary skill in the art can clearly understand that this application can take advantage of software and any necessary hardware to implement the disclosed technique. Based on this understanding, the embodiments can be implemented in the form of a computer-executable software product. This computer-executable software product can be stored in a computer-readable storage media, such as ROM/RAM, computer disk, or CD ROM, in the form of computer-executable instructions that, when executed, carry out the actions of the method described above. It includes a number of instructions for making a workable computer platform (i.e. personal computer, server or network equipment) to implement the various embodiments of the technique or some parts of the method.

The disclosure on the various embodiments has been described in a progressive manner. Some parts with similar implementations are in reference with each other. Nevertheless, each one is emphasized to explain a different implementation of the embodiment. Particularly on the apparatus embodiment, the descriptions are interrelated to that of a method since they have basic resemblance on the implementation. The above-mentioned description of the apparatus only indicates that the units are logically separate components which may or may not be physically separated. The units of display components may or may not be physical units and can be placed in one or multiple network units. Based on the actual needs, one can select among the components or the entire module to achieve the purpose of implementation of the embodiment.

The embodiments can be used in a common or special computer system environment or configurations such as: personal computers, servers, hand held or portable devices, tablet model equipment, multi-processor system, micro-processor based system, set-top boxes, programmable consumer electronics, network PC, minicomputer, mainframe computers, or other distributed computer environments.

The computer implementation can be executed through computer executable commands which are similar to the contextual description. Generally, these computer program modules involve implementing specific tasks or abstract data type of routines, procedures, targets, components, and data structure and other distribution applications. Within this distributed computing environment, computer networks linked by remote processing equipment can be used to implement tasks. And it can also be stored in local and remote storage media.

The above-mentioned embodiments are merely some specific implementations of the present disclosure. A person of ordinary skill in the art knows that the disclosure can have many variations or modifications that do not depart from its spirit. Any modifications and variations are still deemed to be within the limits of the present disclosure.

What is claimed is:

1. A method comprising:
   synchronizing a backup repository based on a version attribute of a content at the backup repository, the synchronizing including backing up an original repository by updating the content in the backup repository that is different between a version of the content at the backup repository and a current version of the content at an original repository;
   in an event of successful synchronization, setting the version attribute of the content at the backup repository to that of the current version of the content at the original repository that is a synchronized version; and
   in an event of unsuccessful synchronization,
      determining that the current version of the content at the original repository is a non-synchronizable version;
      backing up the original repository by duplicating a copy of the current version of the content at the original repository to the backup repository; and
      setting the version attribute of the content at the backup repository to that of the current version of the content at the original repository that is the non-synchronizable version.

2. The method as recited in claim 1, wherein determining that the current version is the non-synchronizable version comprises:
   acquiring an error message of synchronization failure; and
   determining the current version to be the non-synchronizable version based on the error message; or
   determining the current version to be the non-synchronizable version in the event of continued synchronization failure after error processing corresponding to the error message.

3. The method as recited in claim 2, wherein error processing corresponding to the error message comprises:
   deleting a synchronization lock attribute of the backup repository in the event that the error message indicates the backup repository as locked.

4. The method as recited in claim 2, wherein error processing corresponding to the error message comprises:
   deleting a lock attribute of a file in the backup repository in the event that the error message indicates the file in the backup repository as locked.

5. The method as recited in claim 2, wherein error processing corresponding to the error message comprises:
   deleting a latest version of the backup repository and modifying the version attribute of the content at the backup repository to that of a penultimate version in the event that the error message indicates an error in the latest version of the backup repository.

6. An apparatus comprising:
   a synchronization unit that implements a synchronization operation of a backup repository based on a version attribute, the synchronizing including backing up an original repository by updating a content in the backup repository that is different between a version of the content at the backup repository and a current version of the content at an original repository;
   a synchronization success processing unit that, in the event that the synchronization operation by the synchronization unit is successful, sets a version attribute of the content at the backup repository to a value of the current version of the content at the original repository; and
   a synchronization failure processing unit that, in the event that the synchronization operation by the synchronization unit is unsuccessful, backs up the original repository by duplicating a copy of the current version of the content at the original repository to the backup repository and sets the version attribute of the content at the backup repository to the value of the current version of the original repository that is a non-synchronizable version.

7. An apparatus as recited in claim 6, further comprising:
a non-synchronizable version determining unit that includes:
   an error message acquisition sub-unit that acquires an error message when the synchronization operation fails;
   a first determining sub-unit that determines the current version as the non-synchronizable version based on the error message;
   an error processing sub-unit that processes one or more errors based on the error message; and
   a second determining sub-unit that determines the current version as the non-synchronizable version when synchronization still fails after the one or more errors have been processed.

8. An apparatus as recited in claim 7, wherein, in the event that the error message indicates the backup repository as locked, the error processing sub-unit deletes a synchronization lock attribute of the backup repository.

9. The apparatus as recited in claim 7, wherein, in the event that the error message indicates a file in the backup repository as locked, the error processing sub-unit deletes a lock attribute of the file in the backup repository.

10. The apparatus as recited in claim 7, wherein, in the event that the error message indicates an error in a latest version of the backup repository, the error processing sub-unit deletes the latest version of the backup repository and modifies a version attribute of the backup repository to that of a penultimate version.

11. One or more memories containing computer-executable instructions that, when executed, perform a number of actions comprising:
   synchronizing a backup repository based on a version attribute of a content at the backup repository, the synchronizing including backing up an original repository by updating the content in the backup repository that is different between a version of the content at the backup repository and a current version of the content at an original repository;
   in an event of successful synchronization, setting the version attribute of the backup repository to that of the current version of the content at the original repository that is a synchronized version; and
   in an event of unsuccessful synchronization,
      determining that the current version of the content at the original repository is a non-synchronizable version;
      backing up the original repository by duplicating a copy of the current version of the content at the original repository to the backup repository; and
      setting the version attribute of the content at the backup repository to that of the current version of the content at the original repository that is the non-synchronizable version.

12. The one or more memories as recited in claim 11, wherein determining that a current version to be a non-synchronizable version comprises:
   acquiring an error message of synchronization failure; and
   determining the current version to be the non-synchronizable version based on the error message; or
   determining the current version to be the non-synchronizable version in the event of continued synchronization failure after error processing corresponding to the error message.

13. The one or more memories as recited in claim 12, wherein error processing corresponding to the error message comprises:
   deleting a synchronization lock attribute of the backup repository in the event that the error message indicates the backup repository as locked.

14. The one or more memories as recited in claim 12, wherein error processing corresponding to the error message comprises:
   deleting a lock attribute of a file in the backup repository in the event that the error message indicates the file in the backup repository as locked.

15. The one or more memories as recited in claim 12, wherein error processing corresponding to the error message comprises:
   deleting a latest version of the backup repository and modifying the version attribute of the content at the backup repository to that of a penultimate version in the event that the error message indicates an error in the latest version of the backup repository.

\* \* \* \* \*